US012230918B2

(12) United States Patent
Jing

(10) Patent No.: US 12,230,918 B2

(45) Date of Patent: Feb. 18, 2025

(54) ROTATABLE PLUG PULLER

(71) Applicant: Xia Rong Jing, Hubei (CN)

(72) Inventor: Xia Rong Jing, Hubei (CN)

( * ) Notice: Subject to any disclaimer, the term of this patent is extended or adjusted under 35 U.S.C. 154(b) by 345 days.

(21) Appl. No.: 17/830,320

(22) Filed: Jun. 1, 2022

(65) Prior Publication Data

US 2023/0369807 A1 Nov. 16, 2023

(30) Foreign Application Priority Data

May 11, 2022 (CN) ......................... 202221127996.9

(51) Int. Cl.
*H01R 13/633* (2006.01)

(52) U.S. Cl.
CPC ................................ *H01R 13/6335* (2013.01)

(58) Field of Classification Search
CPC ........................ H01R 13/6335; H01R 13/7175
USPC .......................................................... 439/352
See application file for complete search history.

(56) References Cited

U.S. PATENT DOCUMENTS 1,699,722 A * 1/1929 Stott .................. H01R 13/6335 439/484
2,226,385 A * 12/1940 Ramsey ................... H01H 1/42 200/254
2,507,092 A * 5/1950 Cline ................. H01R 13/6335 439/484
5,567,181 A * 10/1996 Lentz ................. H01R 13/6335 439/484
5,860,826 A * 1/1999 Chang ................ H01R 13/6275 439/358
6,053,762 A * 4/2000 Matsumura ........ H01R 13/6335 439/484
6,500,023 B1 * 12/2002 Duong ............... H01R 13/6335 439/484
6,899,556 B2 * 5/2005 Nishida ............. H01R 13/7032 200/51.1
6,991,487 B2 * 1/2006 Wu .................... H01R 13/6275 439/358
7,052,309 B1 * 5/2006 Chen .................. H01R 13/6335 439/484
7,422,457 B1 * 9/2008 Wu ...................... G02B 6/4261 439/258
D594,417 S * 6/2009 Ho'o ......................... D13/138.1
D635,515 S * 4/2011 Atwell ...................... D13/138.2
D638,359 S * 5/2011 Atwell ...................... D13/138.2
8,113,723 B2 * 2/2012 Togami .............. H01R 13/6335 385/75
D660,235 S * 5/2012 Liang-Hsu ................ D13/138.2
D660,236 S * 5/2012 Liang-Hsu ................ D13/139.1

(Continued)

*Primary Examiner* — Alexander Gilman

(57) ABSTRACT

A rotatable puller for a plug, which comprises the handle body and the first rotary connection part and second rotary connection part. The first rotary connection part is mounted on the upper end of the male or female plug in a rotary manner, and the second rotary connection part is mounted on the lower end of the male or female plug in a rotary manner, thus the handle body is assembled with the male or female plug, and is capable of rotation in relation to the male or female plug. To pull out the male or female plug, turn the handle body to the rear side of the male or female plug, and the user can hold the handle body by hand, and apply a force to pull the rotatable puller, so as to pull out the male or female plug easily and quickly.

8 Claims, 6 Drawing Sheets

(56) References Cited

U.S. PATENT DOCUMENTS

| | | | | |
|---|---|---|---|---|
| 8,556,646 | B2 * | 10/2013 | Kappla | G02B 6/4246 439/352 |
| 8,641,443 | B1 * | 2/2014 | Moussa | H01R 13/6335 439/484 |
| 8,901,877 | B2 * | 12/2014 | Brockman | H02J 7/0042 320/105 |
| 9,230,416 | B2 * | 1/2016 | Ward | G02B 6/3895 |
| 9,853,397 | B1 * | 12/2017 | Bucher | H01R 13/6335 |
| 9,929,500 | B1 * | 3/2018 | Ista | H01R 13/6271 |
| 10,193,264 | B1 * | 1/2019 | Marsden | H01R 13/443 |
| 10,374,355 | B2 * | 8/2019 | Ayzenberg | G02B 6/4261 |
| D914,609 | S * | 3/2021 | Mi | D13/137.4 |
| 11,073,667 | B1 * | 7/2021 | Wang | G02B 6/4261 |
| 11,165,199 | B2 * | 11/2021 | Xu | H01R 13/6335 |
| 11,268,684 | B1 * | 3/2022 | Baldwin | F21V 25/00 |
| 2007/0161272 | A1 * | 7/2007 | Lagathu | H01R 13/6335 439/138 |
| 2009/0188095 | A1 * | 7/2009 | Walter | H01R 13/6335 29/278 |
| 2010/0273335 | A1 * | 10/2010 | Wu | H01R 12/721 439/80 |
| 2013/0099736 | A1 * | 4/2013 | Roberts | H01M 10/46 320/109 |
| 2013/0115800 | A1 * | 5/2013 | Chan | H01R 43/20 439/372 |
| 2013/0221868 | A1 * | 8/2013 | Diotte | H01R 13/7175 362/640 |
| 2015/0056831 | A1 * | 2/2015 | Llewellyn, III | H01R 13/6335 439/152 |
| 2015/0064936 | A1 * | 3/2015 | Bartoli | H01R 31/06 439/35 |
| 2015/0180172 | A1 * | 6/2015 | Hiscoke | H01R 13/58 439/153 |
| 2017/0194743 | A1 * | 7/2017 | Lee | H01R 13/635 |
| 2018/0138636 | A1 * | 5/2018 | Hiscoke | H01R 13/5804 |
| 2019/0058275 | A1 * | 2/2019 | Li | H01R 13/504 |
| 2019/0058287 | A1 * | 2/2019 | Li | H01R 13/6275 |
| 2020/0076132 | A1 * | 3/2020 | Yang | H01R 12/73 |
| 2020/0335904 | A1 * | 10/2020 | Lu | G02B 6/4261 |
| 2021/0167559 | A1 * | 6/2021 | Mattei | H01R 13/6658 |
| 2021/0218175 | A1 * | 7/2021 | He | H01R 24/60 |
| 2021/0218176 | A1 * | 7/2021 | He | H01R 13/6335 |
| 2021/0361506 | A1 * | 11/2021 | Gustavson | H05B 45/30 |
| 2021/0384675 | A1 * | 12/2021 | Migliorino | H01R 13/6335 |
| 2022/0109268 | A1 * | 4/2022 | Eshelman | H01R 13/5816 |
| 2022/0140546 | A1 * | 5/2022 | Kupec | H05K 3/403 439/490 |

* cited by examiner

ROTATABLE PLUG PULLER

BACKGROUND OF INVENTION

1. Field of the Invention

The present invention relates generally to the technical field of electrical technology, and more particularly to a rotatable puller for a male or female plug.

2. Description of Related Art

During the use of a prior-art male or female plug, the user pulls out the male plug by holding the male plug by fingers. When the male or female plug is connected tightly, and the size of the male or female plug is big, it is difficult for the fingers to apply a pulling force, and it may be difficult to pull out the male plug simply by the force of the fingers. This makes the operation quite inconvenient, and may cause frustration to the user.

SUMMARY OF THE INVENTION

The purpose of the present invention is to overcome the deficiencies of the prior art and provide a rotatable puller for a plug or a socket.

A rotatable puller for a male or female plug, characterized in that: the handle body (1) comprises the handle body (11) and the first rotary connection part (12) and second rotary connection part (13) respectively configured on the upper end and lower end of the handle body (11), the first rotary connection part (12) is mounted on the upper end of the male plug (2) or female plug (3) in a rotary manner; the second rotary connection part (13) is mounted on the lower end of the male plug (2) or female plug (3) in a rotary manner, so that the handle body is assembled with the male plug (2) or female plug (3), and is capable of rotation in relation to the male plug (2) or female plug (3).

More particularly, the upper end of the male plug (2) or female plug (3) is configured with a connecting column (4), the upper end of the connecting column (4) is formed with a flange (41) protruding outward; the first rotary connection part (12) is configured with a first hole (121), the size of the first hole (121) is larger than the diameter of the connecting column (4), the size of the first hole (1.21) is smaller than the diameter of the flange (41), so that the first rotary connection part (12) can be sleeved on the connecting column (4) through the first hole (121), and be limited on the connecting column (4) through the blocking of the flange (41), and the first rotary connection part (12) is capable of rotation in relation to the connecting column (4).

More particularly, wherein the periphery of the connecting column (4) is further formed with a stopping bump (42) protruding outward; the wall of the first hole (121) is integrally formed with a limiting protrusion (122).

More particularly, wherein the flange (41) is configured with a notch (411) for the limiting protrusion (122) to go through.

More particularly, wherein the periphery of the upper end of the flange (41) is configured with a conical surface (412) to guide the first hole (121) of the first rotary connection part (12) to go through.

More particularly, wherein the second rotary connection part (13) is configured with a second hole (131), and is sleeved outside the SR head (5) on the lower end of the male plug (2) or female plug (3) through the second hole (131), capable of relative rotation.

More particularly, wherein the inner side of the handle body (11) is formed with a plurality of curved convex parts (111), and a plurality of curved grooves (112) matching the fingers are formed between the curved convex parts (111).

More particularly, wherein the first rotary connection part (12) and second rotary connection part (13) are both in the shape of a plate, and are respectively and integrally formed on the same side of the upper end and lower end of the handle body (11), forming the shape of a half square frame.

More particularly, wherein the rotatable puller (1) is integrally formed by soft or hard plastics via plastic forming.

More particularly, wherein an LED light (6) is configured inside the male plug (2) or female plug (3), and the male plug (2) or female plug (3) is configured with a light guiding part (7) corresponding to the LED light (6).

Comparing with the prior art, the present invention has the following benefits:

The rotatable puller of the present invention can be mounted on the male or female plug. To pull out the male or female plug, the handle can be turned to the rear side of the male or female plug, and the user can hold the handle by hand to pull the rotatable puller, thus pulling out the male or female plug. It provides convenience for applying a force to pull out the male or female plug easily and quickly. The operation is very simple and easy. When the rotatable puller is not to be used, it can be turned to the lateral side of the male or female plug, so as to reduce the thickness of the male or female plug due to the protrusion of the handle, and the male or female plug can be used normally.

DETAILED DESCRIPTION OF THE INVENTION

Figure 1:
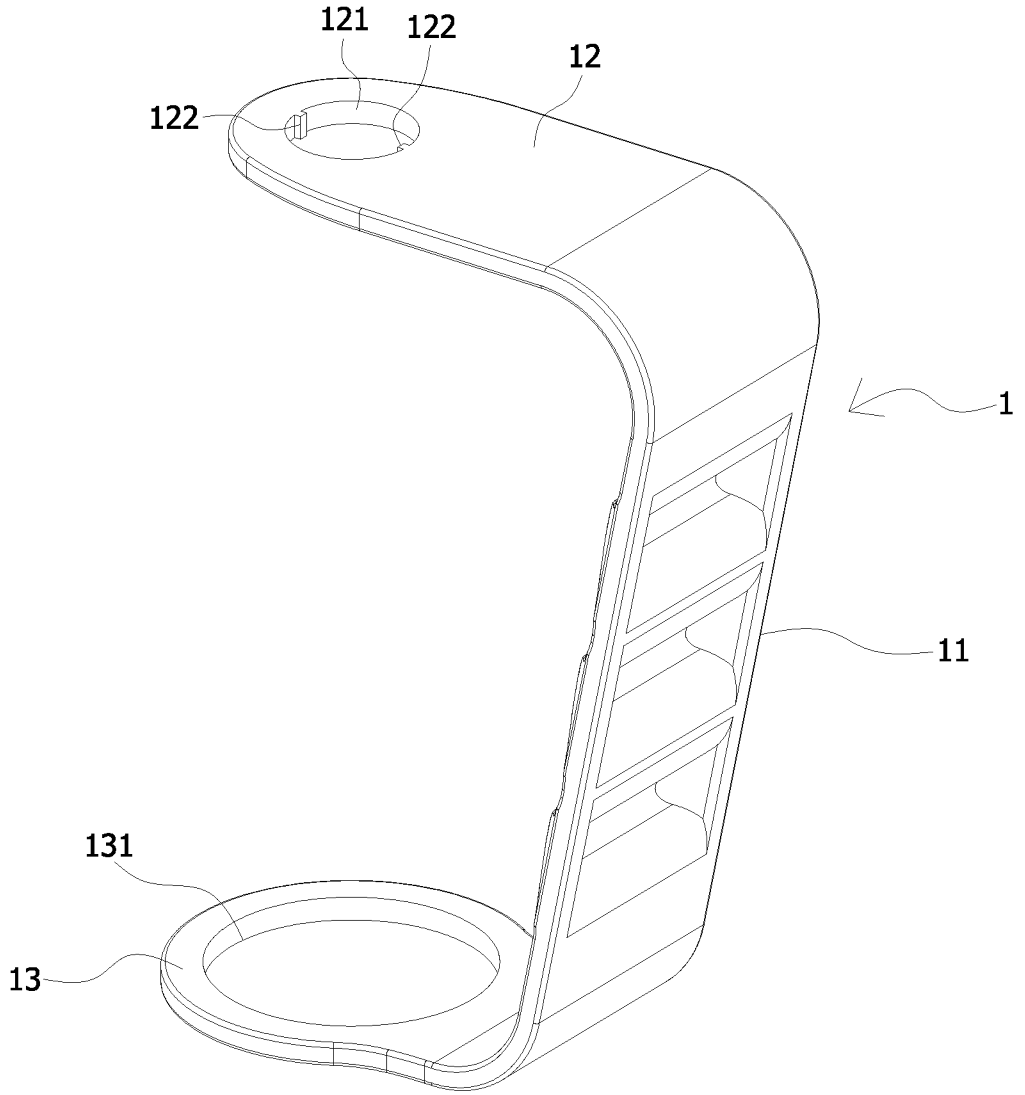
FIG. 1 is a perspective view of the invention.
Figure 2:
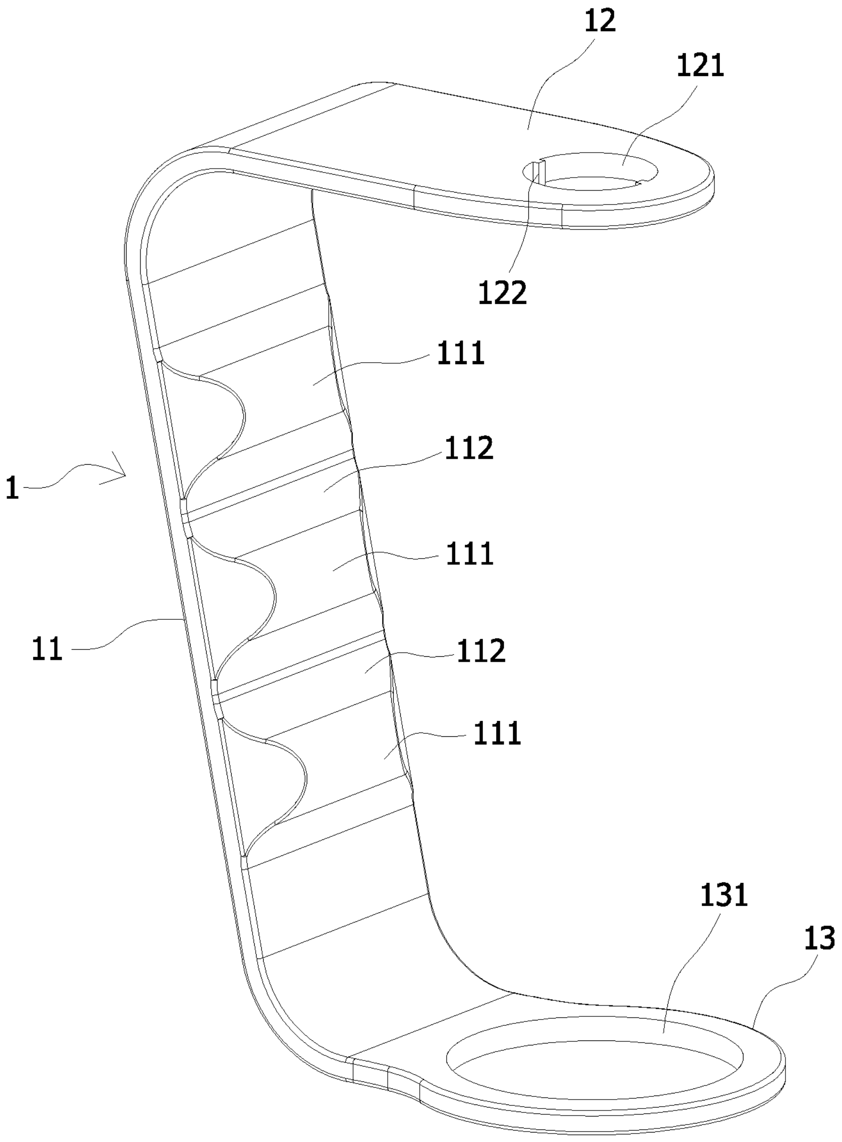
FIG. 2 is another perspective view of the invention.
Figure 3:
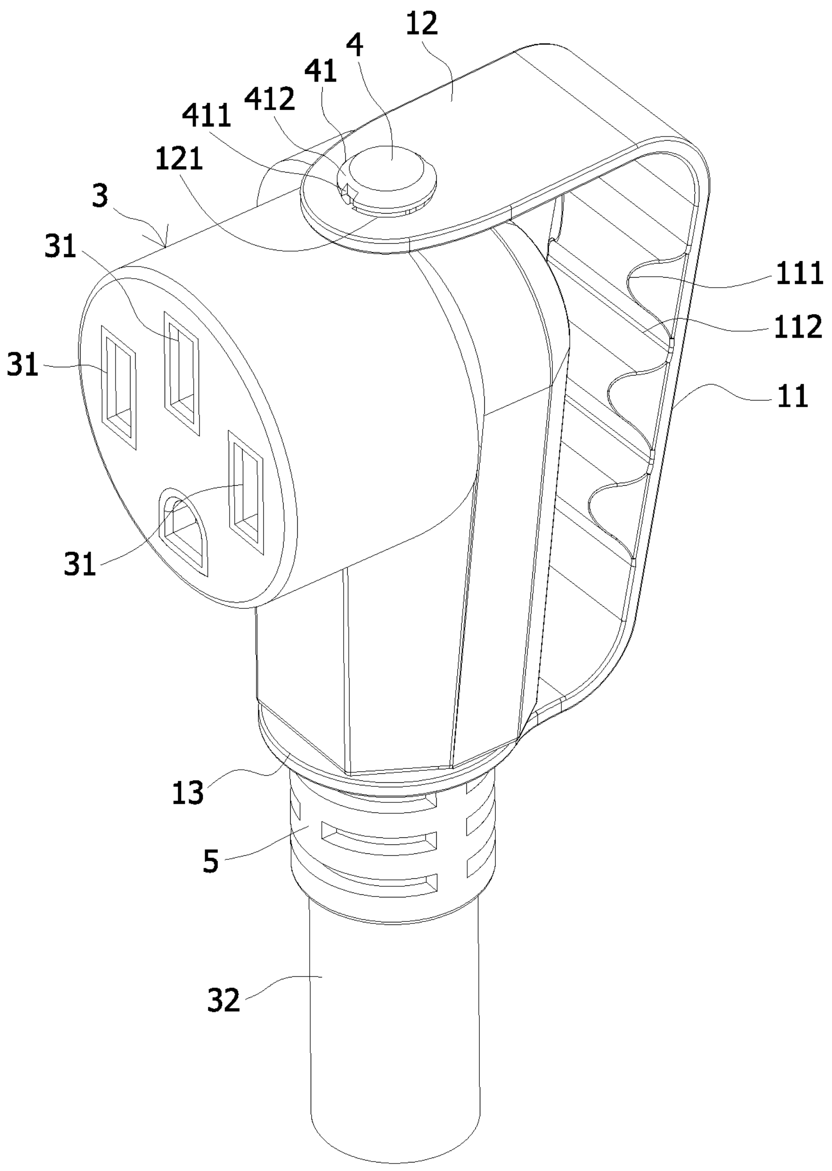
FIG. 3 is a perspective assembled view of the present invention in combination with a female plug.
Figure 4:
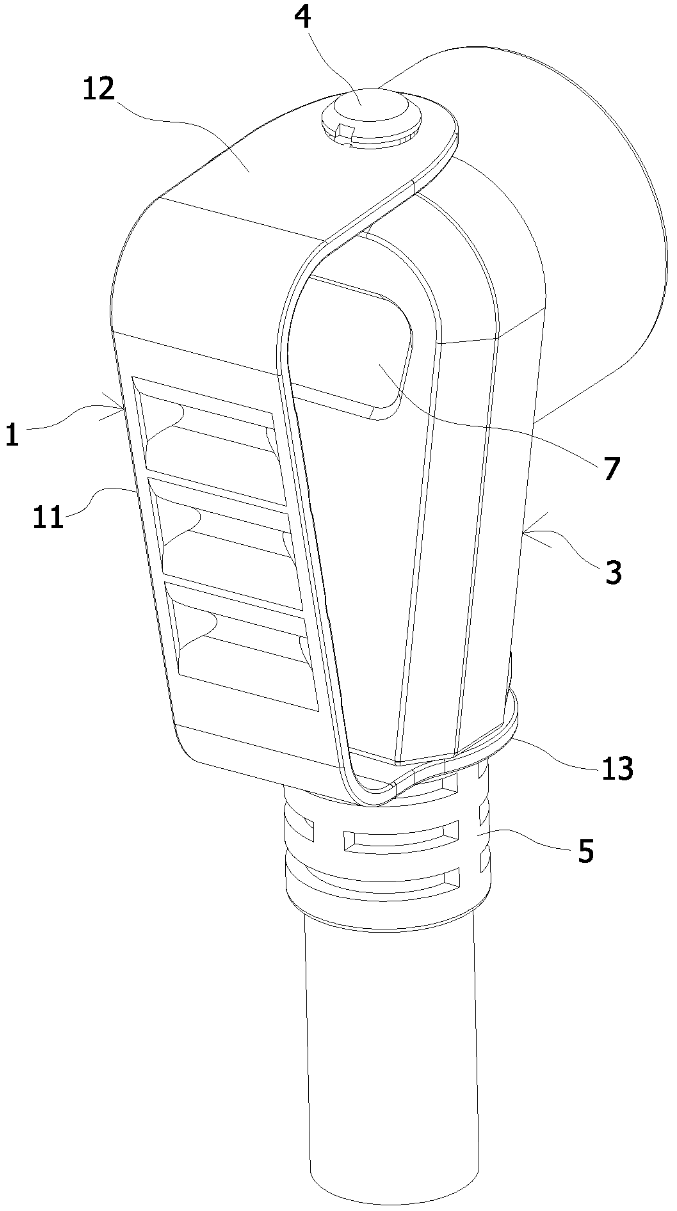
FIG. 4 is another perspective assembled view of the present invention in combination with a female plug.

Depicted in FIGS. 1-5 is a rotatable puller for a female plug. The rotatable puller 1 comprises the puller body 11 and the first rotary connection part 12 and second rotary connection part 13 configured on the upper end and lower end of the handle body. When the rotatable puller 1 is applied in a female plug 3, the first rotary connection part 12 is mounted on the upper end of the female plug 3 in a rotary manner, the second rotary connection part 13 is mounted on the lower end of the female plug 3 in a rotary manner, so that the handle body is assembled with the female plug 3, and is capable of rotation in relation to the female plug 3. The front end of the female plug 3 is configured with several slots 31, several first terminals are configured inside the slots 31 for electrical conduction. The first terminals are electrically connected to the first wires 32 connected with the female plug 3.

Figure 5:
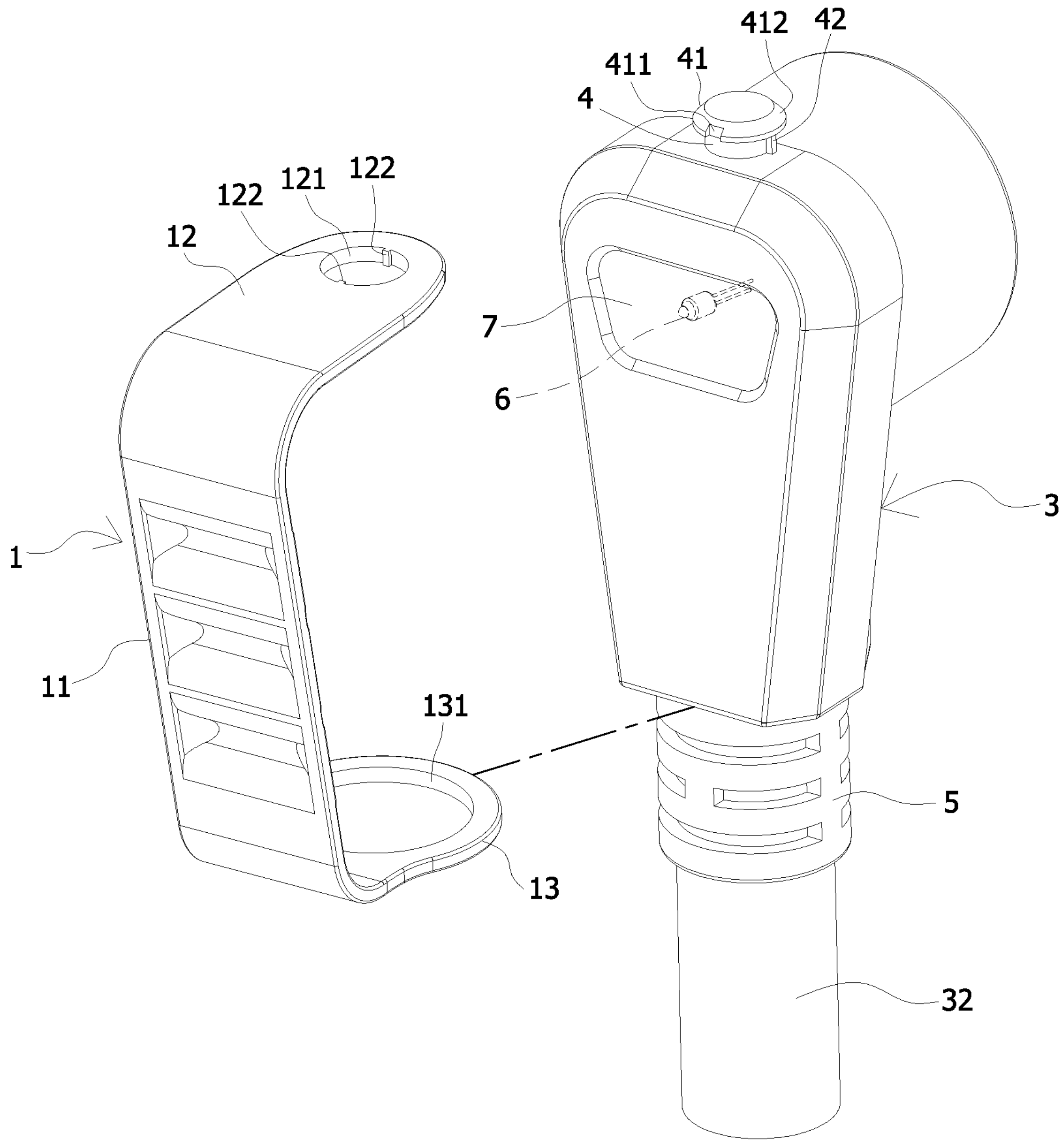
FIG. 5 is an exploded view of FIG. 4.

Referring to FIG. 5, the appearance of the female plug 3 looks like a male plug.

Below are descriptions of the assembly structure of the first rotary connection part 12 and the female plug 3:

The upper end of the female plug 3 is configured with a connecting column 4. The upper end of the connecting column 4 is formed with a flange 41 protruding outward. The first rotary connection part 12 is configured with a first hole 121. The size of the first hole 121 is larger than the diameter of the connecting column 4. The size of the first hole 121 is smaller than the diameter of the flange 41. Thus, the first rotary connection part 12 is fitted on the connecting column 4 through the first hole 121, and is limited on the connecting column 4 through the blocking of the flange 41. Meanwhile, the first rotary connection part 12 is capable of rotation in relation to the connecting column 4. During assembly, the first rotary connection part 12 is sleeved onto the flange 41 through the first hole 121 from top to bottom, and the wall of the first hole 121 is squeezed to slightly deform the hole. Thus, the first rotary connection part 12 goes across the flange 41 and is fitted on the connecting column 4. By now, the assembly is completed.

In order to improve the efficiency of assembly, the following designed is provided: the periphery of the upper end of the flange 41 is configured with a conical surface 412 for the first hole 121 of the first rotary connection part 12 to go through. When the first rotary connection part 12 is sleeved onto the flange 41 from top to bottom through the first hole 121, the wall of the first hole 121 can move along the conical surface 412, so that the first rotary connection part 12 can quickly go across the flange 41 and be sleeved on the connecting column 4. The assembly is more convenient and efficient.

In order to limit the rotation angle when the rotatable puller 1 rotates on the female plug 3, the following design is provided: the periphery of the connecting column 4 is formed with a stopping bump 42 that protrudes outward. The wall of the first hole 121 is integrally formed with a limiting protrusion 122. When the rotatable puller 1 rotates around the female plug 3 till the limiting protrusion 122 touches the stopping bump 42, the rotatable puller 1 cannot rotate further in the same direction. In this way, the rotation angle is limited.

There are two stopping bumps 42, respectively configured on the left and right sides of the connecting column 4, and located on the same line. There are two limiting protrusions 122, respectively configured on the front end and rear end of the wall of the first hole 121, and located on the same line, and in the same direction as the length of the first rotary connection part 12. When puller body 11 of the rotatable puller 1 is rotated to the lateral side of the female plug 3, the limiting protrusion 122 is blocked by the stopping bump 42, to avoid excessive rotation of the rotatable puller 1 and make sure that the puller body 11 is rotated precisely to the lateral side of the female plug 3.

In order for the limiting protrusion 122 to go across the flange 41 more easily, the flange 41 is configured with a notch 411 for the limiting protrusion 122 to go through. Thus, during assembly of the first rotary connection part 12 and the female plug 3, it is more efficient.

The second rotary connection part 13 is configured with a second hole 131, and is sleeved outside the SR head 5 on the lower end of the female plug 3 through the second hole 131, capable of rotation in relation to the female plug 3. During production of the rotatable puller of the invention, it is made together with the plastic part of the female plug 3. In other words, the second rotary connection part 13 and the plastic part of the female plug 3 are produced together by forming in the same mould, so that the second rotary connection part 13 can be sleeved outside the SR head 5 on the lower end of the female plug 3 through the second hole 131. Of course, the following means of assembly is also possible: after sufficient length of the first wire 32 is prepared for the female plug 3, cut the first wire 32, and the second rotary connection part 13 is sleeved in through the second hole 13 from the position of cutting, and fitted outside the SR head 5 on the lower end of the female plug 3. Finally, the first rotary connection part 12 is mounted on the connecting column 4.

In order to enhance the comfort of the fingers touching the puller body 11, the following design is provided: the inner side of the puller body 11 is formed with a plurality of curved convex parts 111 and a plurality of curved grooves 112 between the curved convex parts 111 to mesh with the fingers. When the user grips the puller body 11 by hand and the fingers touch the curved grooves 112, the user will feel more comfortable. Also, it provides an anti-skidding effect and makes it easier to apply a force to pull out the female plug 3. The operation is more convenient.

The first rotary connection part 12 and second rotary connection part 13 are both in the shape of a plate, and integrally formed on the same side of the upper end and lower end of the puller body 11, forming the shape of a half square frame.

The rotatable puller 1 is made of soft or hard plastics and integrally produced by plastic forming. During production, manufacturers can choose soft plastics or hard plastics according to practical conditions. If it is integrally formed by hard plastics, the performance will be better and operation easier.

Inside the female plug 3, an LED light 6 is provided. And the female plug 3 is configured with a light guiding part 7 corresponding to the LED light 6. Thus, when the female plug 3 is connected to electricity, the LED light 6 will emit light, and the light will be exposed through the light guiding part 7, indicating power-on. The usage is more convenient.

In summary, the rotatable puller 1 of the invention is mounted on the female plug 3 in a rotary manner. To pull out the female plug 3, turn the puller body 11 to the rear end of the female plug 3. Then, the user can grip the puller body 11 and apply a force to pull the rotatable puller outward to pull out the female plug 3. The invention makes it easy to apply a pulling force, and the operation to pull out the female plug 3 is simple and easy. When the rotatable puller 1 is not to be used, the puller body 11 can be turned to the lateral side of the female plug 3, so as to reduce the thickness of the female plug 3 due to the protrusion of the puller body 11 on the rear side. And the female plug 3 can be used normally.

Figure 6:
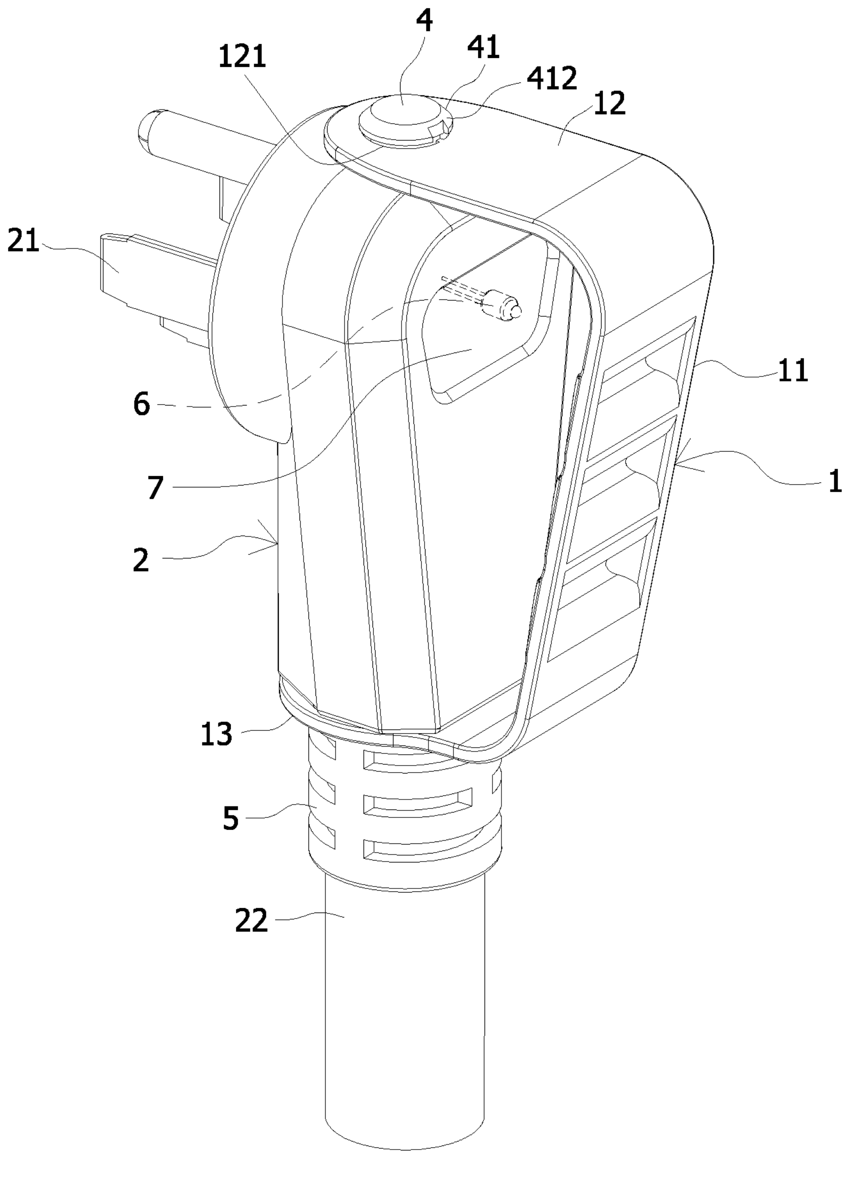
FIG. 6 is a perspective assembled view of the present invention in combination with a male plug.

Referring to FIG. 6, when the rotatable puller 1 of the invention is applied in combination with a male plug 2, the first rotary connection part 2 is mounted on the upper end of the male plug 2 in a rotary manner, the second rotary connection part 13 is mounted on the lower end of the male plug 2 in a rotary manner, so that the handle body is assembled with the male plug 2, and is capable of rotation in relation to the male plug 2. The front end of the male plug 2 is configured with several conductive inserting plates 21. The conductive inserting plates 21 is electrically connected to the second wire 22 connected with the male plug 2. The structure in the assembly between the present invention and the male plug 2 is similar to the assembly between the present invention and the female plug 3, with the same technical effect, and is therefore not repeated herein.

The rotatable puller 1 of the present invention is mounted on the male plug 2 in a rotary manner. To pull out the male plug 2, turn the puller body 11 to the rear side of the male plug 2. Then the user can grip the puller body 11, and apply a force to pull the rotatable puller outward to pull out the male plug 2. When the rotatable puller 1 is not to be used, the puller body 11 can be turned to the lateral side of the male plug 2, so as to reduce the thickness of the male plug 2 due to the protrusion of the puller body 11 on the rear end. Thus, the male plug 2 can be used normally.

I claim:

1. A rotatable puller for a plug, comprising a puller (1) including a puller body (11) and a first rotary connection part (12) and a second rotary connection part (13) respectively configured on an upper end and a lower end of the puller body (11), wherein the first rotary connection part (12) is mounted on an upper end of a male plug (2) or a female plug (3) in a rotary manner; the second rotary connection part (13) is mounted on the lower end of the male plug (2) or the female plug (3) in a rotary manner, the puller is mounted on the male plug (2) or the female plug (3), and can be rotated relative to the male plug (2) or female plug (3);

an upper end of the plug is configured with a connecting column (4), an upper end of the connecting column (4) is formed with a flange (41) protruding outward; the first rotary connection part (12) is configured with a first hole (121), the size of the first hole (121) is larger than the diameter of the connecting column (4), the size of the first hole (121) is smaller than the diameter of the flange (41), so that the first rotary connection part (12) can be sleeved on the connecting column (4) through the first hole (121), and be limited on the connecting column (4) through the blocking of the flange (41), and the first rotary connection part (12) is capable of rotation in relation to the connecting column (4);

the periphery of the upper end of the flange (41) is configured with a conical surface (412) to guide the first hole (121) of the first rotary connection part (12) to go through.

2. The rotatable puller for the plug defined in claim 1, wherein the periphery of the connecting column (4) is further formed with a stopping bump (42) protruding outward; the wall of the first hole (121) is integrally formed with a limiting protrusion (122).

3. The rotatable puller for the plug defined in claim 2, wherein the flange (41) is configured with a notch (411) for the limiting protrusion (122) to go through.

4. The rotatable puller for the plug defined in claim 1, wherein the second rotary connection part (13) is configured with a second hole (131), and is sleeved outside the SR head (5) on the lower end of the male plug (2) or female plug (3) through the second hole (131), capable of relative rotation.

5. The rotatable puller for the plug defined in claim 1, wherein the inner side of the handle body (11) is formed with a plurality of curved convex parts (111), and a plurality of curved grooves (112) matching the fingers are formed between the curved convex parts (111).

6. The rotatable puller for the plug defined in claim 5, wherein the first rotary connection part (12) and second rotary connection part (13) are both in the shape of a plate, and are respectively and integrally formed on the same side of the upper end and lower end of the handle body (11), forming the shape of a half square frame.

7. The rotatable puller for the plug defined in claim 6, wherein the rotatable puller (1) is integrally formed by soft or hard plastics via plastic forming.

8. The rotatable puller for the plug defined in claim 1, wherein an LED light (6) is configured inside the plug, and the plug is configured with a light guiding part (7) corresponding to the LED light (6).

* * * * *